US010935646B2

(12) United States Patent
Wu et al.

(10) Patent No.: US 10,935,646 B2
(45) Date of Patent: Mar. 2, 2021

(54) ULTRASONIC TRANSDUCER WITH COMPOSITE CASE

(71) Applicant: SIMTRANS TECH INC, Apia (WS)

(72) Inventors: Wen-Jong Wu, New Taipei (TW); Nai-Chang Wu, New Taipei (TW); Yuan-Ping Liu, New Taipei (TW); Wei-Ren Lai, New Taipei (TW); Chao-Ting Wu, New Taipei (TW)

(73) Assignee: SIMTRANS TECH INC, Apia (WS)

( * ) Notice: Subject to any disclaimer, the term of this patent is extended or adjusted under 35 U.S.C. 154(b) by 184 days.

(21) Appl. No.: 16/124,463

(22) Filed: Sep. 7, 2018

(65) Prior Publication Data

US 2019/0004162 A1    Jan. 3, 2019

Related U.S. Application Data

(63) Continuation-in-part of application No. 14/631,521, filed on Feb. 25, 2015, now abandoned.

(60) Provisional application No. 61/945,362, filed on Feb. 27, 2014.

(51) Int. Cl.
| | | |
|---|---|---|
| *G01S 7/521* | (2006.01) | |
| *G01S 15/04* | (2006.01) | |
| *G10K 9/22* | (2006.01) | |
| *G01S 15/931* | (2020.01) | |
| *G10K 9/122* | (2006.01) | |

(52) U.S. Cl.
CPC .............. *G01S 7/521* (2013.01); *G01S 15/04* (2013.01); *G01S 15/931* (2013.01); *G10K 9/122* (2013.01); *G10K 9/22* (2013.01); *Y10T 428/13* (2015.01); *Y10T 428/1355* (2015.01)

(58) Field of Classification Search
CPC ........ G01S 7/521; G01S 15/04; G01S 15/931; G10K 9/22; G10K 9/122; Y10T 428/13; Y10T 428/1355
See application file for complete search history.

(56) References Cited

U.S. PATENT DOCUMENTS

| 4,556,814 A | 12/1985 | Ito et al. |
| 2009/0243886 A1 | 10/2009 | Eccardt et al. |

*Primary Examiner* — Michael C Miggins
(74) *Attorney, Agent, or Firm* — Arent Fox LLP

(57) ABSTRACT

A composite case of an airborne ultrasonic transducer for transmitting, receiving, or both of ultrasound in atmospheric environment at an ultrasound pressure level is disclosed. The case comprises a first case component and at least a second case component. The second case component is made of a material different from the first case component having an acoustic impedance smaller than that of said first case component and is structurally connected to the first case component for reducing said mechanical quality factor while maintaining said ultrasound pressure level. The connection between the first and second case components is by strong bonding at an interface between the components so that the strong bonding forms a composite structure for the case.

12 Claims, 11 Drawing Sheets

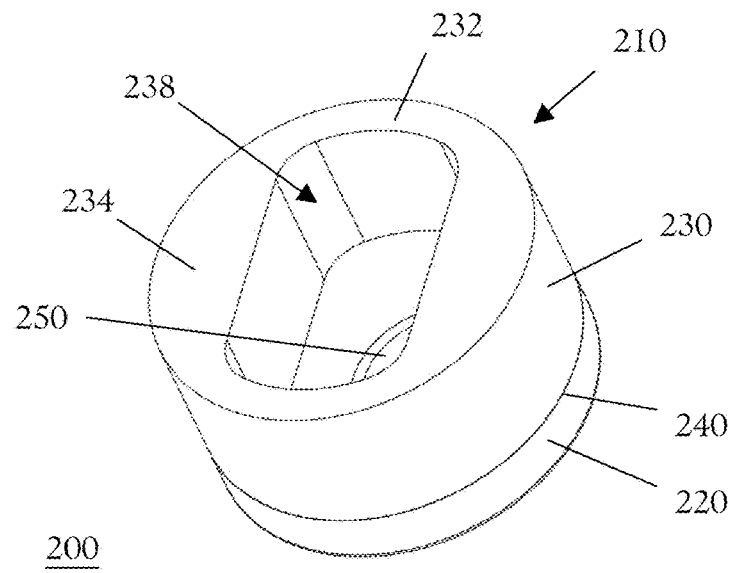
FIG. 2
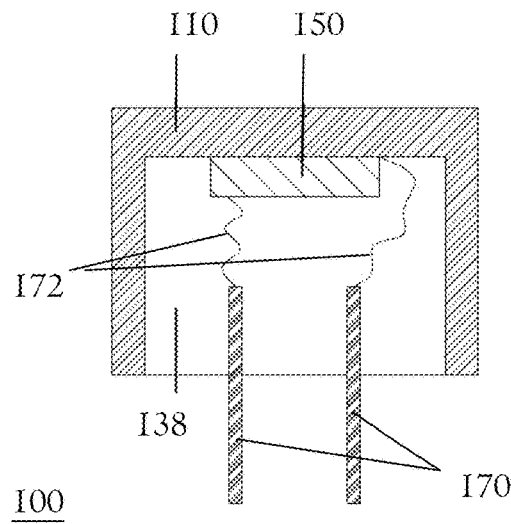
FIG. 1 ~ Prior Art
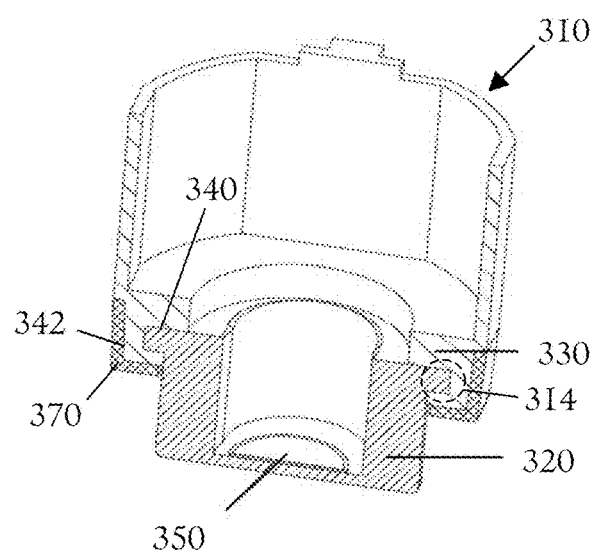
FIG. 3

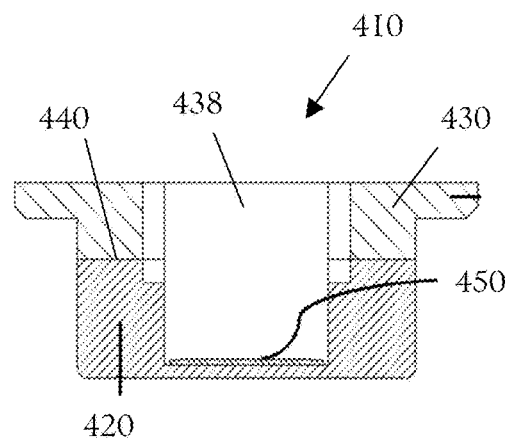 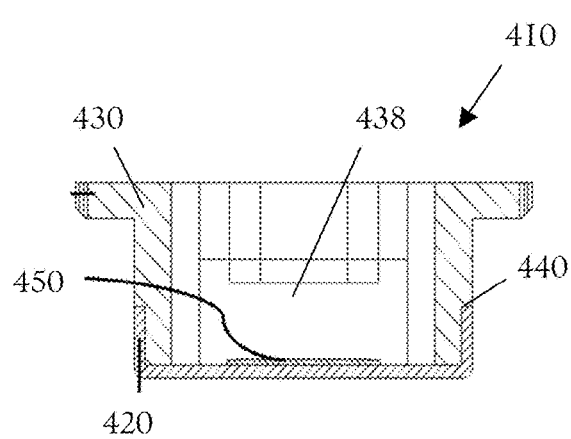
*FIG. 4A*      *FIG. 4B*
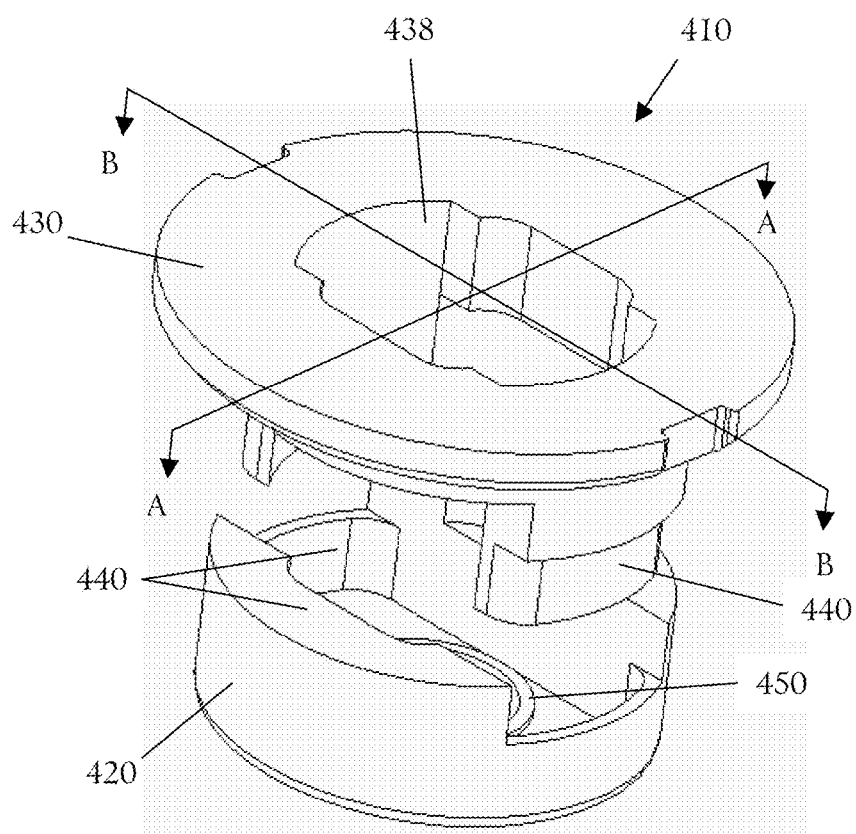
*FIG. 4*

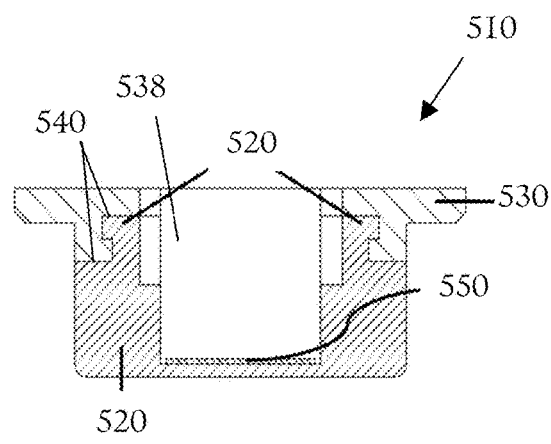
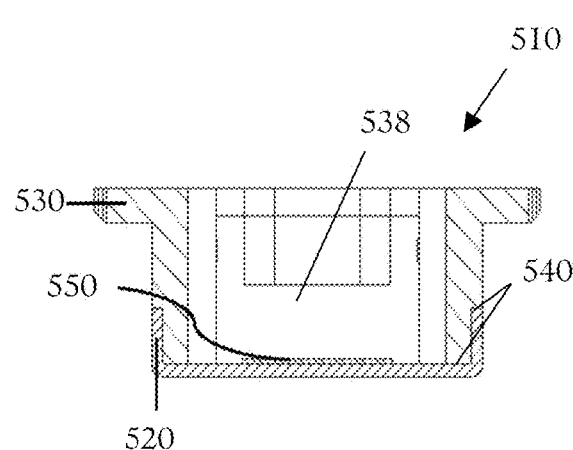
*FIG. 5A*  *FIG. 5B*
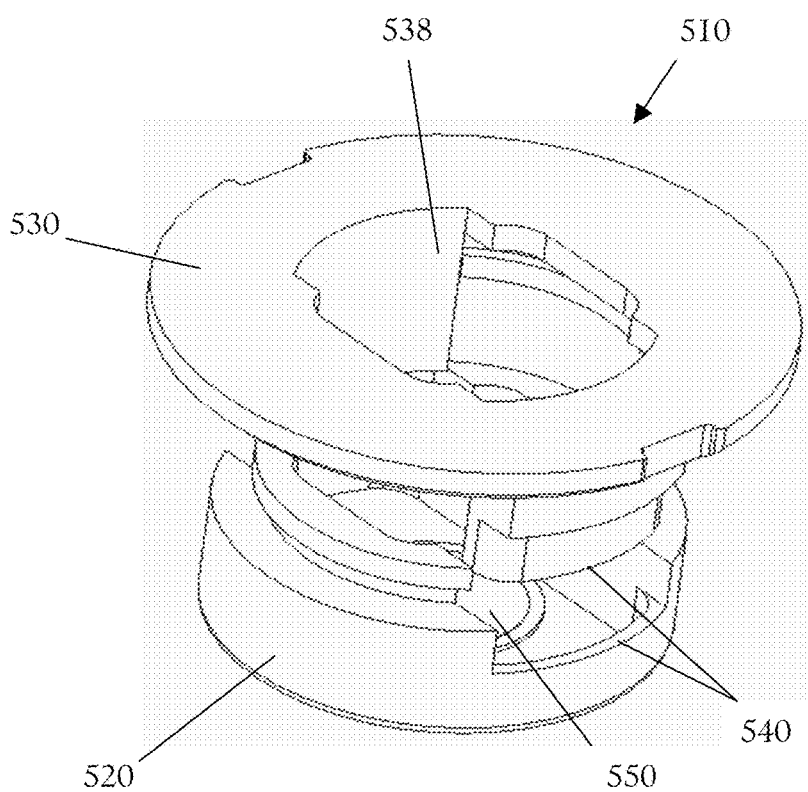
*FIG. 5*

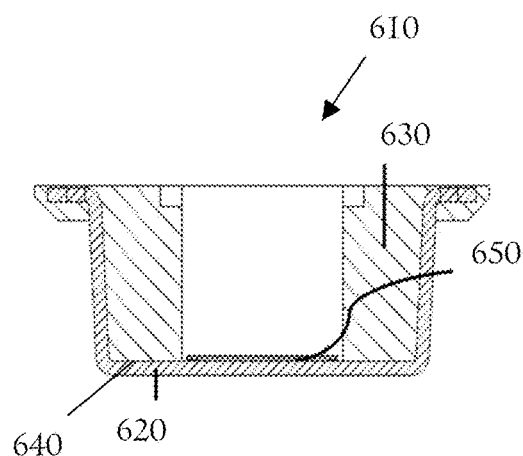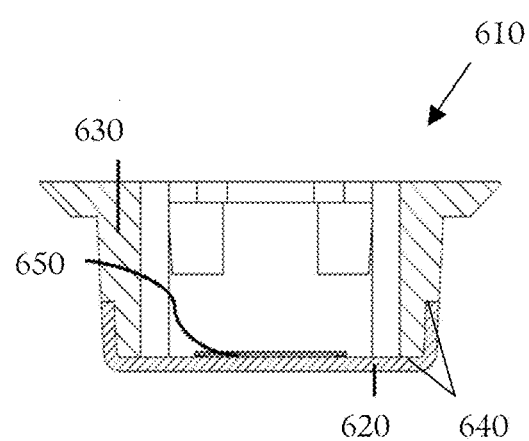
*FIG. 6A*  *FIG. 6B*
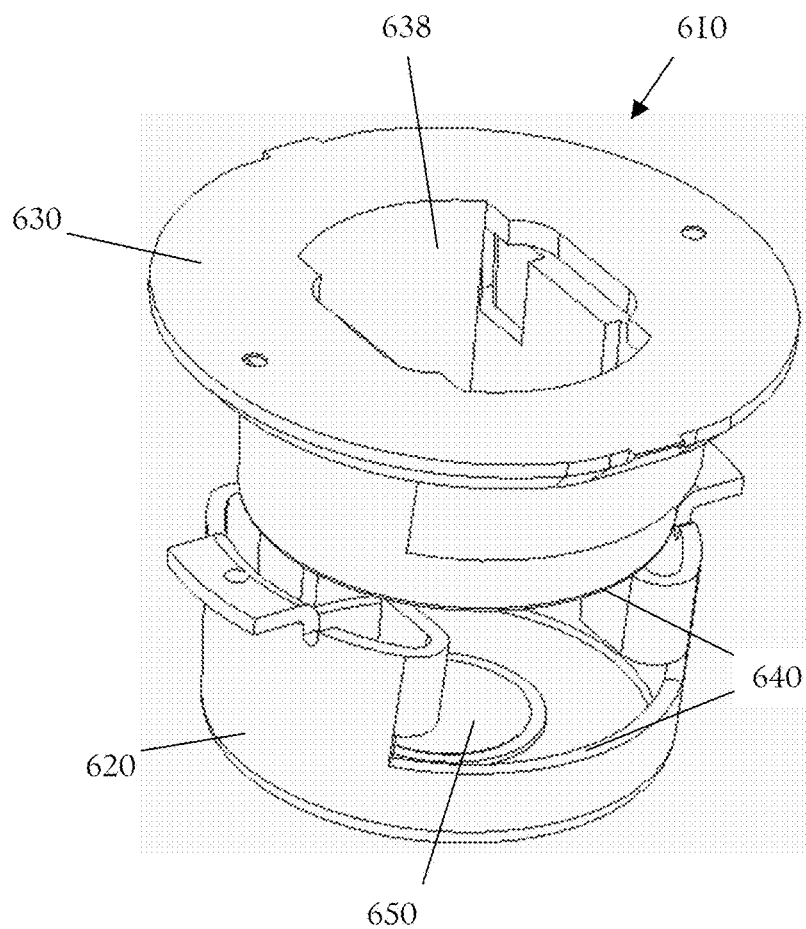
*FIG. 6*

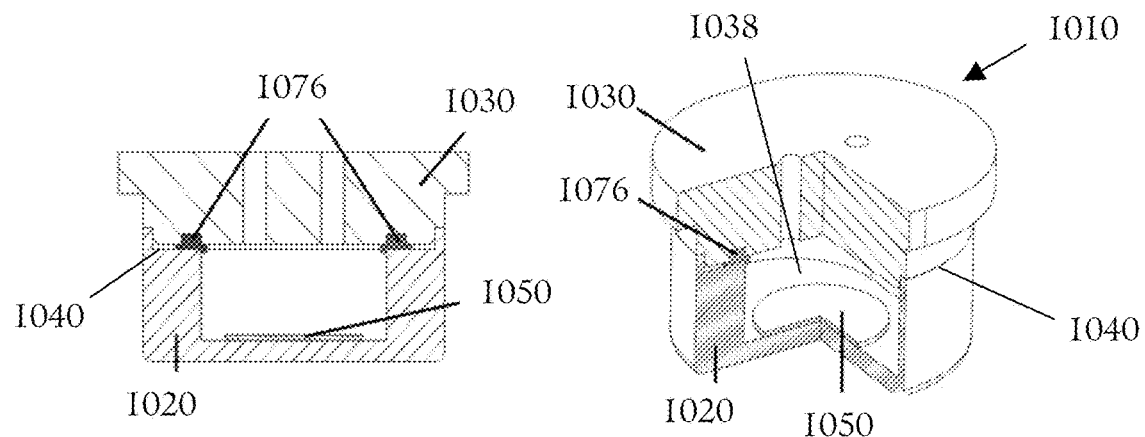
*FIG. 10A*  *FIG. 10B*
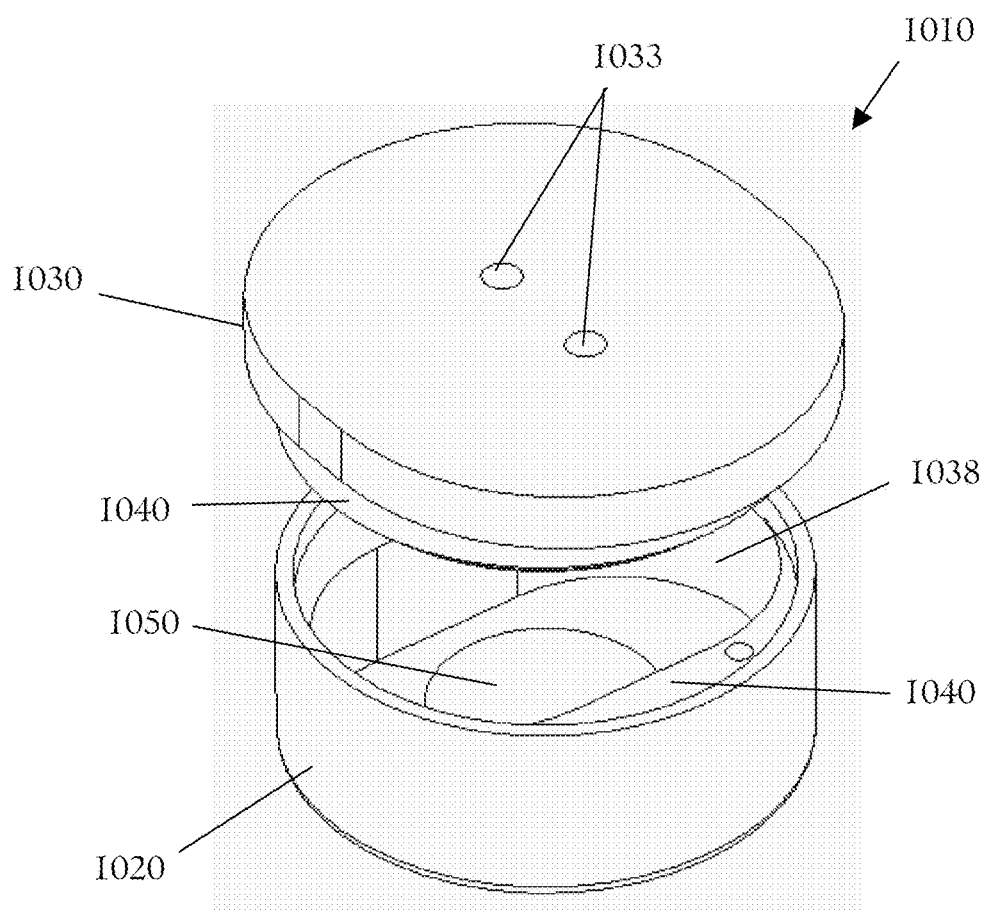
*FIG. 10*

FIG. 12
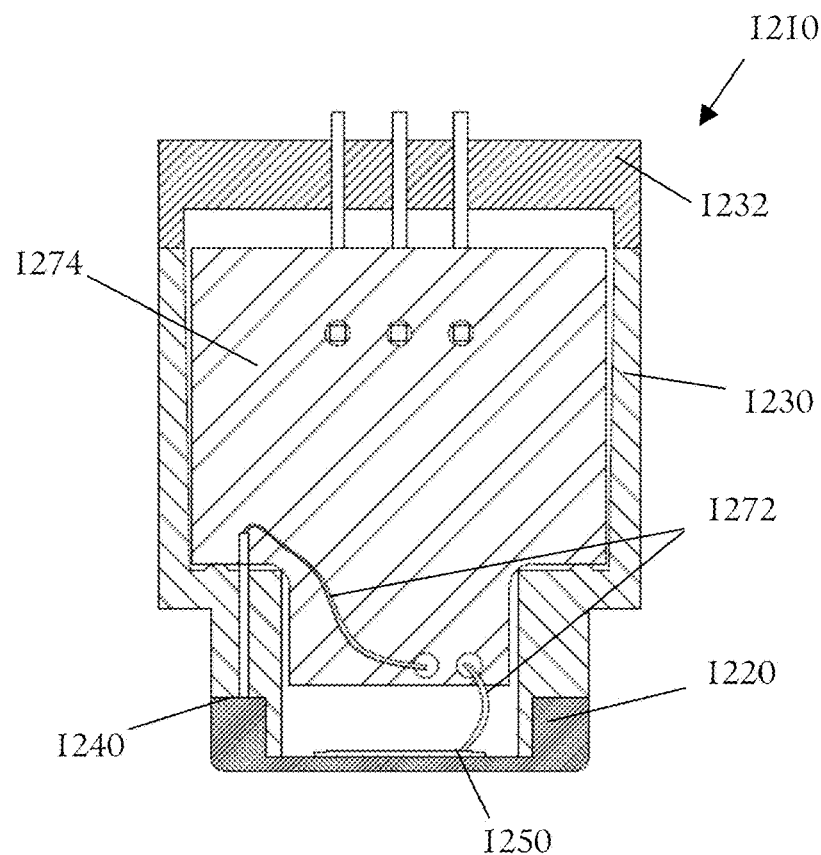
FIG. 13A
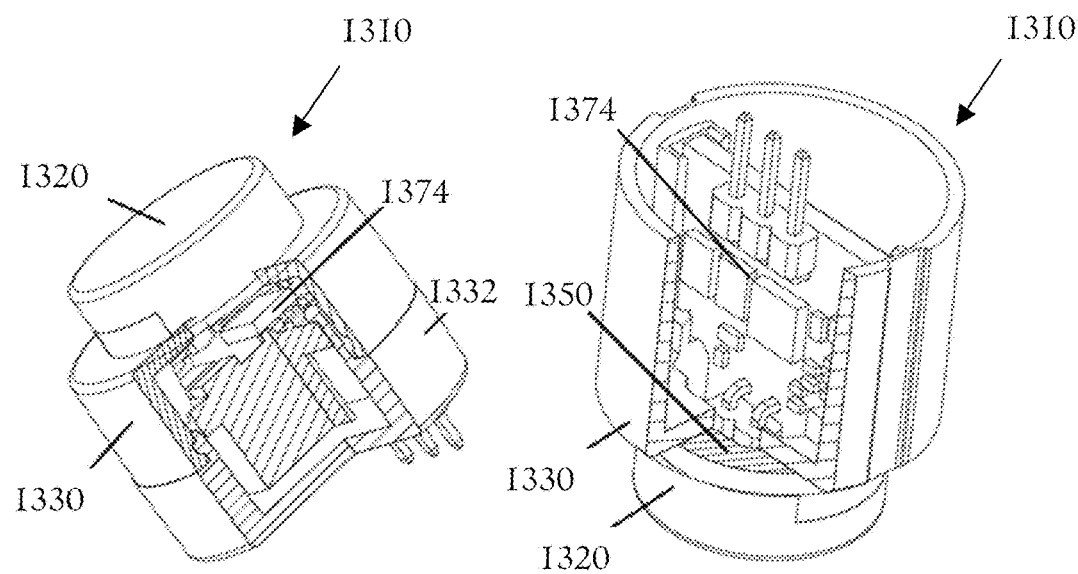
FIG. 13B

ULTRASONIC TRANSDUCER WITH COMPOSITE CASE

CROSS-REFERENCE TO RELATED APPLICATIONS

This application is a Continuation-in-Part of U.S. patent application Ser. No. 14/631,521, filed on Feb. 25, 2015, which claims the benefit of U.S. Provisional Application No. 61/945,362, filed on Feb. 27, 2014. The disclosures of the priority applications are hereby incorporated by reference in their entirety.

BACKGROUND

Field of the Invention

The present invention relates in general to an ultrasonic transducer. In particular, the present invention relates to an airborne ultrasonic transducer with composite case for improved object detection in atmospheric environment for automotive applications yet easy and low-cost to manufacture.

Description of the Related Art

An airborne ultrasonic transducer is also called a transceiver if it both sends and receives ultrasound in the air for the purposes of such as object presence and location detection. It is basically a device having a converter that performs electrical to mechanical energy conversion for ultrasound emission and the reversed conversion for ultrasound detection. Blocks made of piezoelectric material are normally used as the converter in modern applications. A transducer case is normally attached to the converter for both to mechanically vibrate together which serves to shape the desired ultrasound emission and reception characteristics that are required by various different applications. Metal such as aluminum is normally used to make the transducer case.

FIG. 1 schematically illustrates the cross section of a conventional ultrasonic transducer 100, which includes a case 110 that houses a piezoelectric block, an electrical-mechanical energy converter 150. This converter is connected to a control electronics (not shown) via electrical wires 172 through a pair of electrically conductive pins 170. The piezoelectric converter 150 is normally adhered to the top of the cup-shaped case 110 by strong bonding so that the case serves to shape and amplify the ultrasound for the desired usefulness of the transducer 100.

In general, a basic transducer case has a cup-shaped structural body that normally has the piezoelectric energy converter attached to its base, literally at the top of the cup-shaped case. Physical shape and dimensions as well as mechanical characteristics of the material used to make the case are the primary factors to determine the transducer characteristics that must meet the requirements of the intended ultrasonic sensing application.

For example, in a conventional closed type ultrasonic transducer, the piezoelectric element is attached to the top of the metallic case and ultrasound wave is emitted off the back side surface of the top of the case. By designing the entire case structure including the shape and dimensions of the inner cavity and the thickness of the sidewalls of the cup-shaped case, it is possible to shape up the desired ultrasound coverage field. As an example, unequal coverage angles in the horizontal and vertical directions are required for ultrasonic radar found in the rear end of automotives.

However, to make a transducer case with the necessary shape and with precision, machining processes are normally required. Complexity of the shape such as the shape of the cup-shaped body's inner opening prevents the use of less expensive methods such as hydraulic stamping press.

Also, in most commercial applications where a single ultrasonic transducer works in both the ultrasound emission and reception modes, the transmitting and the receiving functions must be separated via a time-sharing control scheme. Specifically, the transducer emits ultrasound wave in a one time slot and then switches mode to receive the ultrasound reflected by the target in a subsequent time slot. In most cases a smaller reverberation time is preferable. Normally this reverberation time is dependent on the mechanical quality (Q) factor of the ultrasonic vibration of the device. A smaller Q factor usually leads to a smaller reverberation time. Unfortunately, smaller Q factor also leads to smaller sound pressure level, which means reduced detection distance.

This is an issue difficult to resolve for transducers using conventional metallic case. Conventional solution calls for the trade-off between sound pressure level and small reverberation time. Q factor needs to be controlled carefully by the use of glue inside the transducer case body. The idea is for the glue to contribute its damping to the bodily vibration of the entire ultrasonic transducer. However, uniformity of glue is not easy to maintain in the manufacturing process. Especially, shape of inner opening of the metallic case is frequently complicated that easily leads to non-uniformity in the application of the glue. More, glue takes time to dry which prolongs time of manufacture.

Further, in order to deliver sufficient sound pressure level, electrical driving voltage applied to the piezoelectric element is typically high while voltage of the electrical signal converted from the received reflected ultrasound is relatively very low. This pair of high and low signals easily interfere with each other. Also, signal-to-noise ratio is limited, especially in a system with long wires that lead from the system electronics to the piezo converter. To achieve higher signal-to-noise ratio, the electronics circuitry needs to be positioned as close to the transducer as possible. The problem is that the printed circuit board bearing the electronics, if installed inside the case, influences the vibration performance of the entire system. And, space inside the case is, in most cases, not large enough to accommodate the board.

SUMMARY OF THE INVENTION

There is therefore the need to simplify the manufacturing of the airborne transducer case by eliminating the sophisticated machining processes.

There is also the need to reduce the Q factor of the airborne transducer case while still provides sufficient ultrasound pressure level.

There is also the need to discard the influence on the Q factor of the airborne transducer case due to the use of glue.

There is also the need to install the electronics printed circuit board inside the airborne transducer case for shortened lead wires to improve overall signal-to-noise ratio of the transducer system.

The present invention achieves the above and other objects by providing a composite case of an airborne ultrasonic transducer for transmitting, receiving, or both of ultrasound in the atmospheric environment. The case comprises a first case component and at least a second case component. The second case component is made of a material different from the first case component having an acoustic impedance smaller than that of said first case component and is structurally connected to the first case component by strong bonding at an interface between the components for reducing said mechanical quality factor while maintaining said ultrasound pressure level. The strong bonding forms a composite structure for the case.

In an embodiment of the composite case for ultrasonic transducer according to the present invention the strong bonding is an adhesive strong bonding formed between the case components using structural adhesive.

In an embodiment of the composite case for ultrasonic transducer according to the present invention the first case component is a metallic component and the second case component is a plastic component.

In an embodiment of the composite case for ultrasonic transducer according to the present invention the first case component is a metallic component made by stamping press or machining processes. The second case component has a generally hollow cylindrical shape, and the first case component is in a cup shape with a piezoelectric element attached to the inner bottom top plate. The top plate vibration of the first case component induced from the piezoelectric element driven with high voltage emits ultrasound from the outer top of the first ease component into the air.

In an embodiment of the composite case for ultrasonic transducer according to the present invention the second case component is a plastic component made by injection molding. The second case component is in a hollow cylindrical shape. The acoustic impedance of the plastic second case component is smaller than the acoustic impedance of the metallic first case component, which helps to reduce the Q factor while maintaining the ultrasound pressure level.

In an embodiment of the composite case for ultrasonic transducer according to the present invention the strong bonding is formed in an in-mold injection molding procedure or via bonding using a strong structural adhesive.

BRIEF DESCRIPTION OF THE DRAWINGS

FIG. 1 schematically illustrates the cross section of a conventional ultrasonic transducer.

FIG. 2 schematically shows the perspective of an ultrasonic transducer having a composite case according to the present invention.

FIG. 3 is a cut-away perspective view of a composite case according to the present invention with a metallic base component structurally connected to two other components including at least one plastic.

FIGS. 4-11 are, respectively, exploded perspective and unexploded cross-sectional views of several preferred embodiments of the composite case according to the present invention.

FIG. 12 schematically illustrates an ultrasonic transducer that functions as a whole system that includes piezoelectric converter, composite case and control electronics PCB.

FIGS. 13A and 13B are partially cut-away views showing an embodiment of FIG. 12.

DETAILED DESCRIPTION OF THE PREFERRED EMBODIMENTS

Figure 7A:
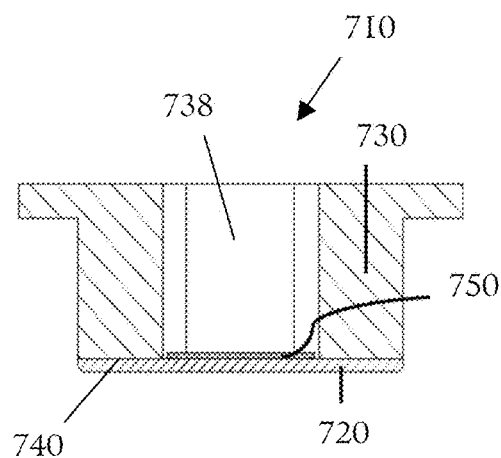
Figure 7B:
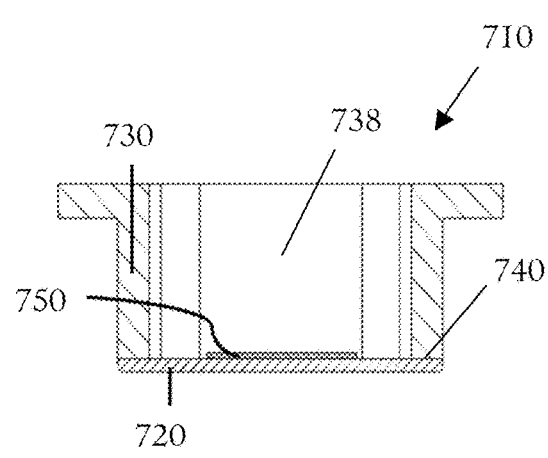

FIG. 2 schematically shows the perspective of an ultrasonic transducer 200 having a composite case 210 according to the present invention. The composite case 210 for ultrasonic transducer according to an embodiment of this invention includes a metallic 220 and a plastic component 230. The two components 220 and 230 are connected to each other via strong bonding at an interface, shown in the drawing by reference numeral 240. This interface 240 provides a perfectly matched and seamless interconnection between the two so that both components are securely adhered to each other to make up a composite structure.

In the preferred embodiment depicted in FIG. 2 the first case component 220 an be a metallic base, and the second case component 230 can be a generally hollow cylindrically shaped structure with a central opening 238 that has an elongated cross section. This means this second case component 230, a plastic part in a preferred embodiment, has a thin sidewall 232 and a thick sidewall 234, as is found in most rear ultrasonic radar of modern cars. A piezoelectric converter 250 is bonded to the inner surface of the metallic first case component 220 at about the center. This positions the converter 250 to literally the center of the top of the cup-shaped composite case 210 when its first and second components 220 and 230 are properly adjoined at the connecting interface 240 for the construction of the composite case 210 for the transducer 200.

Since the case 210 is divided into two component parts 220 and 230, each is then allowed to have a much less complicated shape than the entire case that is made as one single component. Shape complexity of the two smaller components is therefore reduced that simple production methods such as stamping press for the metallic component and injection molding for the plastic component all become advantageously feasible.

In the embodiment of FIG. 2, plastic component 230 contributes the reduction of the Q factor of the entire composite case 210 because the elastic nature thereof makes its own Q factor much lower than that of the metallic component 210 so that the combined composite case 210 exhibits a low Q factor. More, plastic material has lower mass density than metal. Thus the plastic component further makes the overall mass of the composite case 210 significantly smaller than one that is made entirely of metal. Under equal mechanical excitation, a smaller-mass composite case generates stronger vibration and thus greater sound pressure level. The composite case 210 therefore enjoys both decreased Q factor and increased sound pressure level. This further leads advantageously to increased bandwidth of the ultrasonic transducer.

This also further reduces the need for the use of vast amounts of glue, which is used conventionally for its contribution to Q factor reduction yet with a problematic issue in application uniformity.

Further, also as a result of the reduced use of glue, more inner space inside the composite case becomes available and allows for the installation of the system electronics printed circuit board therein.

The composite case for ultrasonic transducer according to an embodiment of this invention further exhibits the capability to induce more than one vibration modes near the operable frequency range. Therefore, it is possible to have more than one operable resonant frequencies in the composite case-based transducer of the present invention. One single ultrasonic transducer according to the present invention can thus operate different frequency control schemes for different ultrasound detection characteristics such as flexibilities in detecting angles and distances.

According to the underlying concept of the present invention, a composite case allows the ultrasonic transducer to vibrate as a composite structure not only in the mechanical sense. The composite case-based ultrasonic transducer also functions to deliver the desired acoustic features under the broader concept of a composite system.

Thus, a preferred embodiment of a composite case for ultrasonic transducer according to the present invention comprises a first case component and at least a second case component. The second case component is made of a material different from the first case component and is structurally connected to the first case component by strong bonding at an interface between the components so that the strong bonding forms a composite structure for the case.

FIG. 3 is a cut-away perspective view of a composite case 310 according to the present invention. It has a metallic base component 320 structurally connected to two other components that include at least one plastic 330 and a third case component 370, which is made of a material other than the metal and the plastics used for components 320 and 330. This means the composite case 310 is a composite structure of three components—320, 330 and 370. This also means that the composite case 310 has two connection interfaces among its three components. Interface 340 is between components 320 and 330, and interface 342 is between components 330 and 370.

Note that the connection interface between components 320 and 330 highlighted by the dotted circle 314 indicates that the two can not be assembled after each is independently made into its shape and structure. One way to form such a complicated and rugged interface is the use of in-mold injection molding. For example, the metallic component 320 is made first and placed inside an injection molding machine so that the plastic component 330 can be made and forming such an interface.

FIGS. 4, 4A and 4B are, respectively, exploded perspective and unexploded cross-sectional views of another preferred embodiment, a composite case 410 according to the present invention. FIG. 4A is the cross-sectional view of the composite case 410 taken by cutting in the A-A line along the longitudinal axis of the case. FIG. 4B, on the other hand, is obtained by cutting into the B-B line.

The exploded perspective view in FIG. 4 shows that the connecting interface 440 between the two components 420 and 430 is highly irregular and rugged that the strong bonding is easily achievable between the two. Industrial processes such as structural adhesive bonding, implant injection, molecular bonding, NMT (nano molding technology), IMP (in-mold pasting), or even mechanical connection by screws are all feasible to establish a strong bonding between the components.

Figure 7:
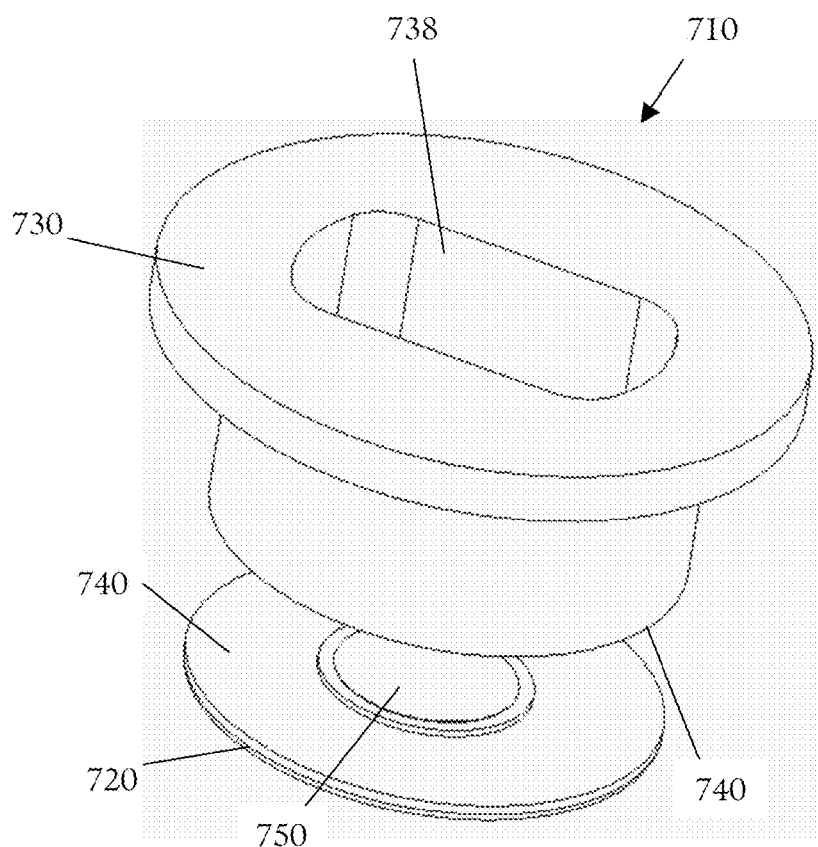
Figure 8A:
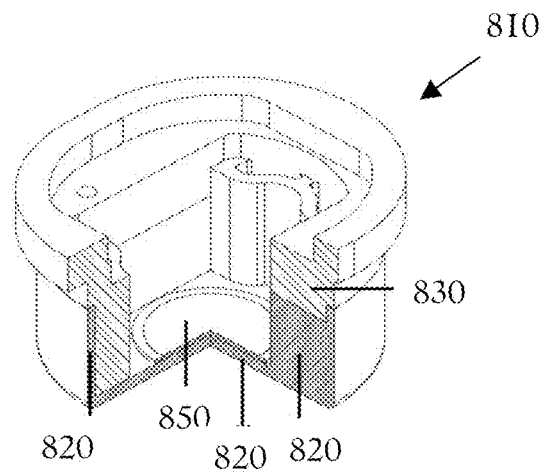
Figure 8:
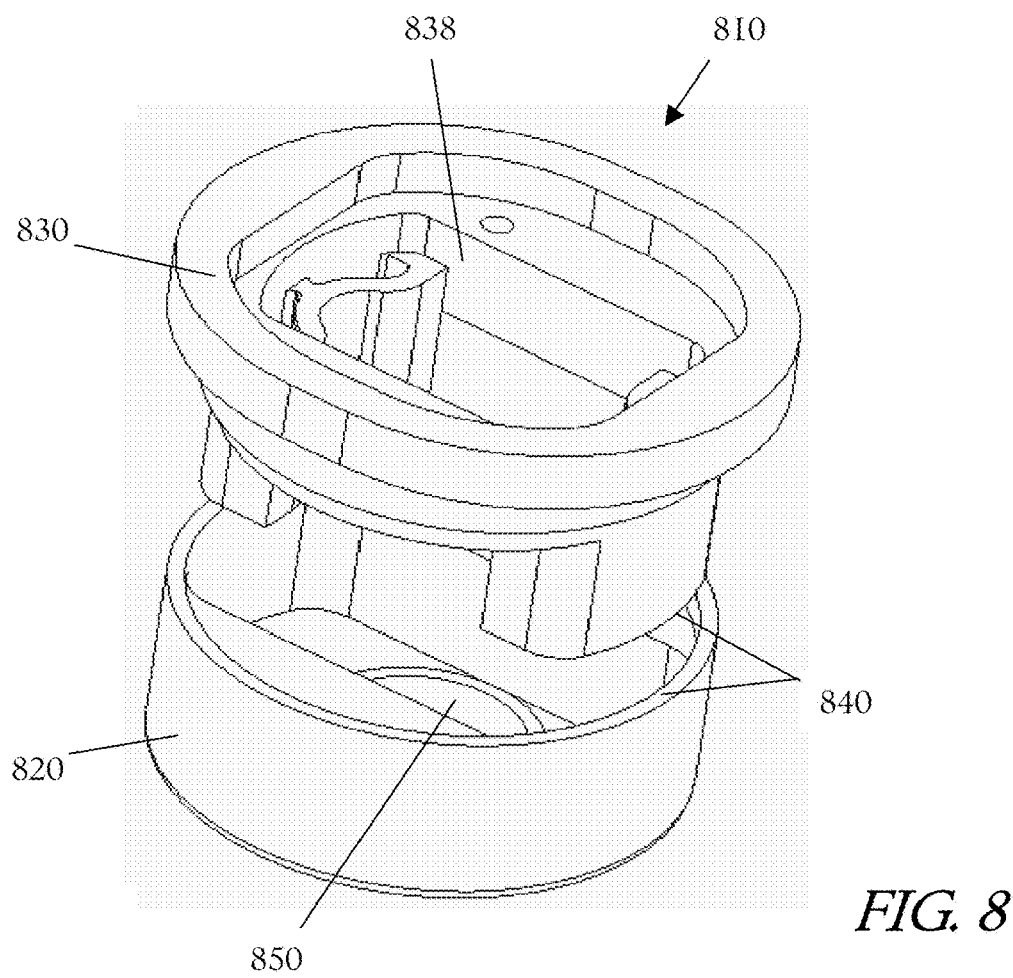
Figure 9A:
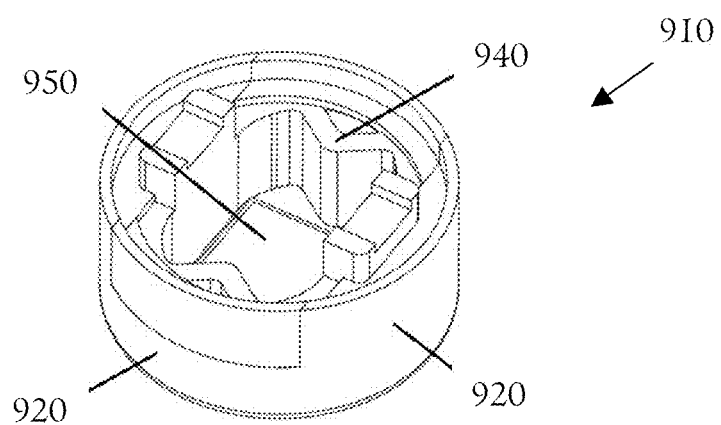
Figure 9:
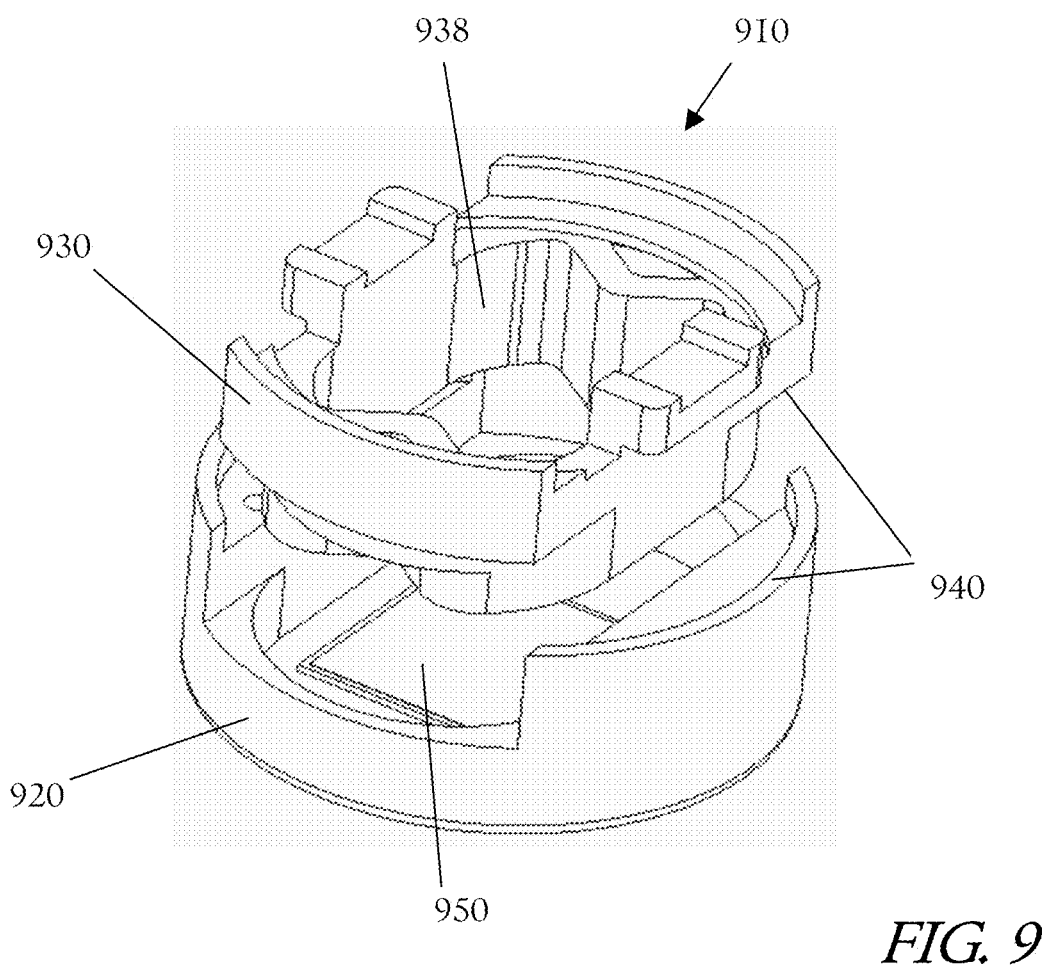

FIGS. 5-11 are, respectively, exploded perspective and unexploded cross-sectional views of several other additional preferred embodiments of the composite case according to the present invention. Note that these are examples of different designs but embodying the idea of composite case of the present invention. They are not explained in detail herein but the reference numeral designation in the drawing help explain them. The last two digits of the reference numeral depict the same element among all drawings. The third and fourth (when applicable) of the reference numeral indicate drawing figure number. Thus, for example, reference numeral 750 indicates the piezoelectric converter of the example in FIG. 7 comparable to the piezo converter 250 in FIG. 2.

Among the examples, the composite case 710 depicted in FIG. 7 has a very simple first, preferably a metallic base, component 720. The piezoelectric converter 750 is adhered to the center of this base component, and the second, preferably a plastic cylindrical body, component 730 is bonded to the first at the interface 740.

The simple flat-plate construction of the metallic component 720 allows the use of stamping press for cost-effective manufacture of the composite case. No costly machining procedure is necessary. By comparison, the composite case 610 of FIG. 6 also features a metallic base component 620 that can be produced using stamping press procedure.

Figures 11A, 11B:
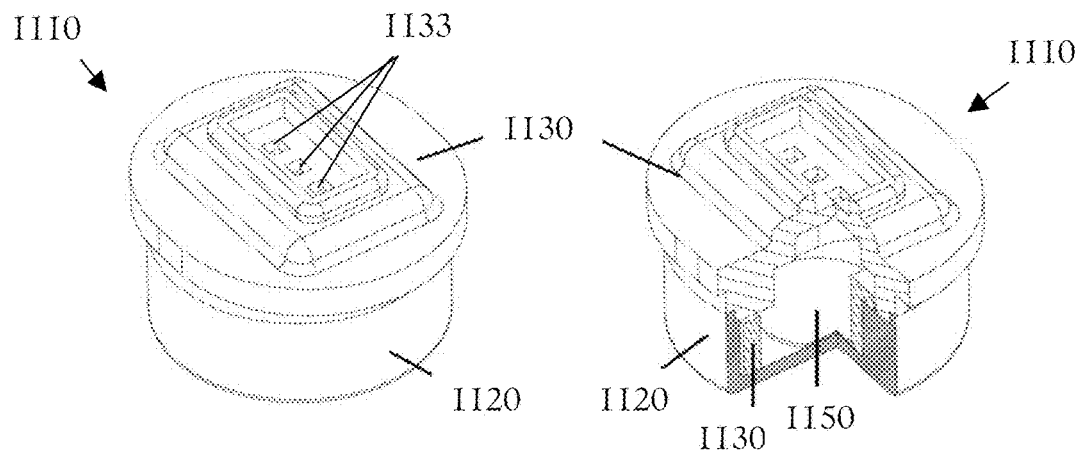
Figure 11:
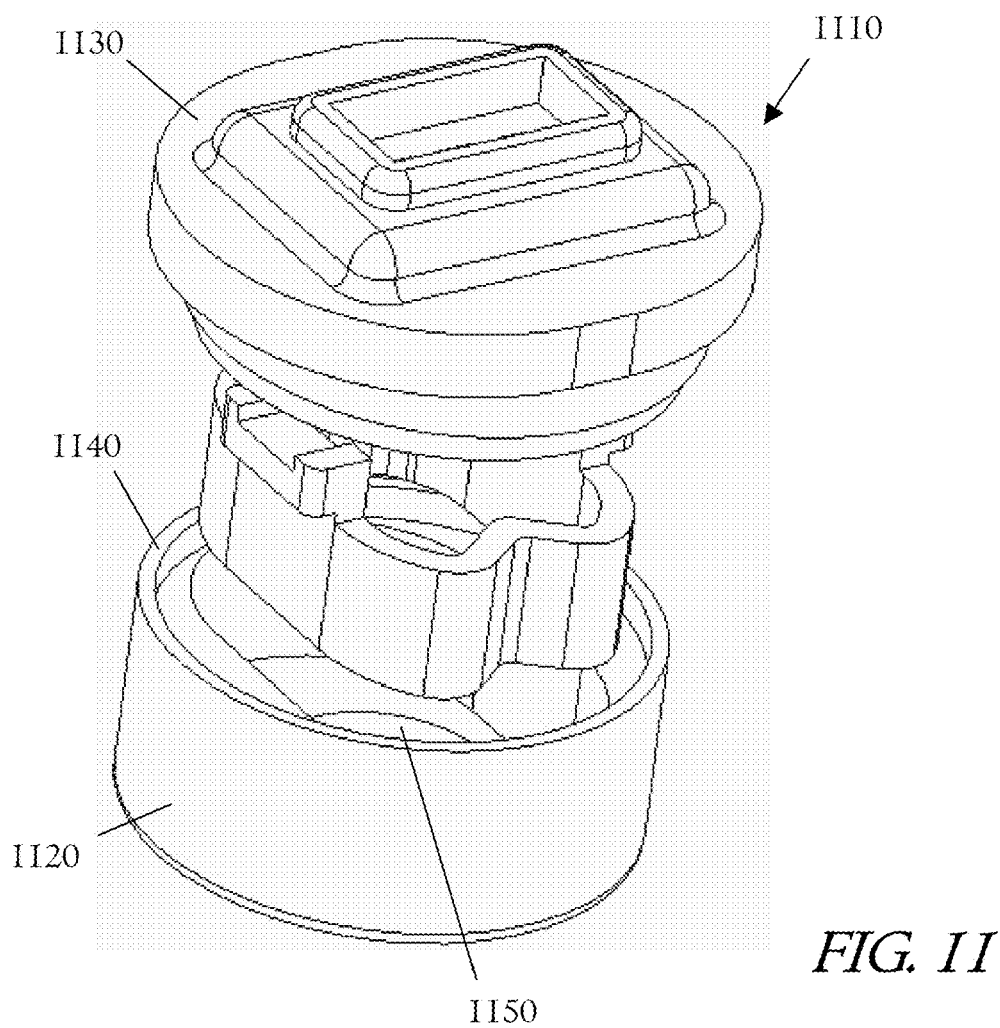

The composite case 1010 of FIG. 10 is a closed type transducer case as the second, preferably a plastic, component 1030 has an end surface that encloses the central opening 1038 inside the case. A pair of holes 1033 are provided on the end surface to allow electrical connection to the electronics that can be housed inside the opening 1038. By contrast, another closed type composite case 1110 of FIG. 11 provides three holes 1133 on its second, preferably plastic, component 1130 for electrical connection to the electronics housed inside the composite case.

Figure 14:
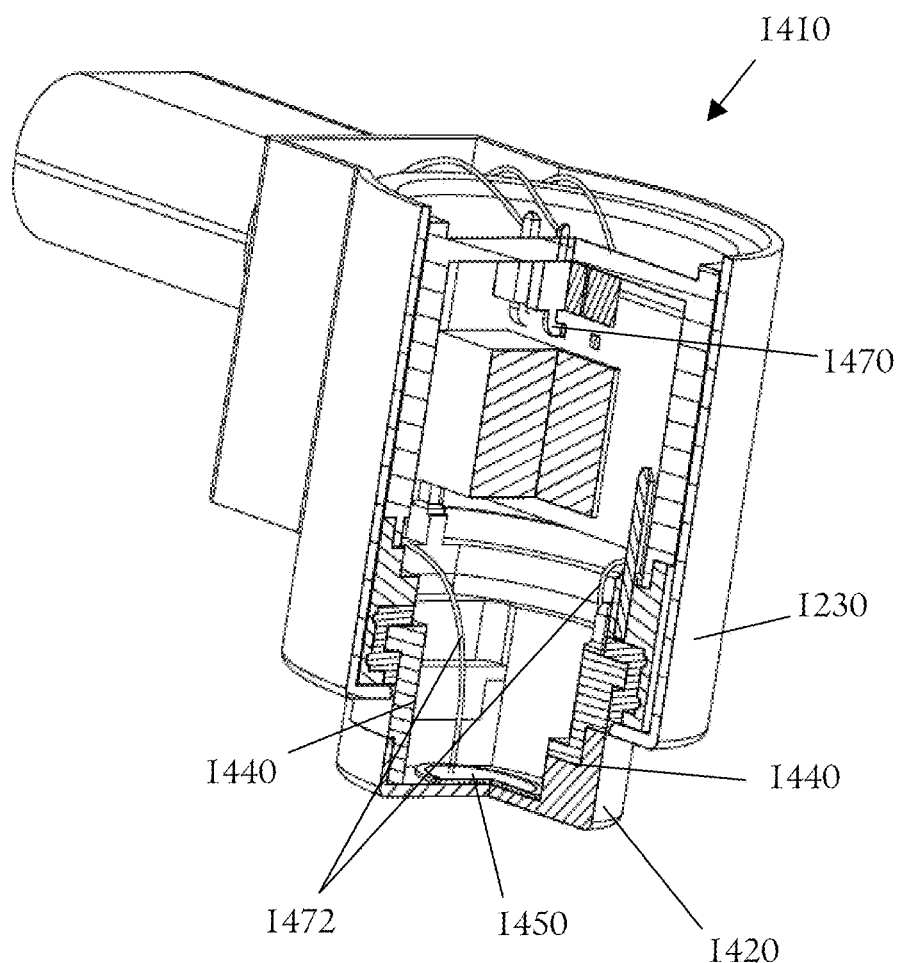
FIG. 14 is partially cut-away view showing another embodiment similar to FIG. 12.

FIG. 12 schematically illustrates an ultrasonic transducer that functions as a whole system that includes piezoelectric converter, composite case and control electronics PCB. FIGS. 13A and 13B are partially cut-away views showing an embodiment of FIG. 12. FIG. 14 is partially cut-away view showing another embodiment similar to FIG. 12.

While the above is a full description of specific embodiments of the present inventive apparatus, various modifications, alternative constructions and equivalents may be used. Therefore, the above description and illustrations should not be taken as limiting the scope of the present invention, which is defined by the appended claims.

What is claimed is:

1. A composite case of an airborne ultrasonic transducer having a piezoelectric converter and a mechanical quality factor for transmitting, receiving, or both of ultrasound in atmospheric environment at an ultrasound pressure level, said composite case comprising:
    a metal portion having an inner surface of a top plate for receiving the piezoelectric element attached to the inner surface and ultrasound is emitted from an outer surface of said top plate into the air and an ultrasound is received from the air via the outer surface of said top plate; and
    at least one plastic portion structurally connected to said metal portion by strong bonding at an interface therebetween for reducing said mechanical quality factor while maintaining said ultrasound pressure level, said strong bonding referring to a bonding for allowing a deformation of said composite case to deform continuously from the metal portion to the plastic portion.

2. The composite case of claim 1 wherein
    said plastic portion has a generally hollow cylindrical shape; and
    said metal portion is in a cup shape; and vibration of said top plate of said metal portion induced by said piezoelectric element driven by a high voltage emits ultrasound from the outer surface of said top plate of said metal portion into the air.

3. The composite case of claim 1 wherein said strong bonding is an adhesive strong bonding formed between said metal portion and plastic portion using structural adhesive.

4. The composite case of claim 1 wherein said strong bonding is formed in an in-mold injection molding procedure.

5. The composite case of claim 1 wherein said metallic portion is made by stamping press.

6. The composite case of claim 1 wherein said plastic portion is made by injection molding.

7. An airborne ultrasonic transducer comprising:
a piezoelectric converter; and
a composite case, comprising:
a metal portion having an inner surface of a top plate for receiving the piezoelectric element attached to the inner surface and ultrasound is emitted from an outer surface of said top plate into the air and an ultrasound is received from the air via the outer surface of said top plate;
at least one plastic portion structurally connected to said metal portion by strong bonding at an interface therebetween for reducing a mechanical quality factor while maintaining an ultrasound pressure level, said strong bonding referring to a bonding for allowing a deformation of said composite case to deform continuously from the metal portion to the plastic portion.

8. The airborne ultrasonic transducer of claim 7 wherein said plastic portion has a generally hollow cylindrical shape; and said metal portion is in a cup shape and vibration of said top plate of said metal portion induced by said piezoelectric element driven by a high voltage emits ultrasound from the outer surface of said top plate of said metal portion into the air.

9. The airborne ultrasonic transducer of claim 7 wherein said strong bonding is an adhesive strong bonding formed between said metal portion and plastic portion using structural adhesive.

10. The airborne ultrasonic transducer of claim 7 wherein said strong bonding is formed in an in-mold injection molding procedure.

11. The airborne ultrasonic transducer of claim 7 wherein said metallic portion is made by stamping press.

12. The airborne ultrasonic transducer of claim 7 wherein said plastic portion is made by injection molding.

* * * * *